United States Patent [19]

Crandall

[11] 4,406,426
[45] Sep. 27, 1983

[54] SECRECY-CODED CASSETTE

[76] Inventor: Richard Crandall, 150 W. Huron, Chicago, Ill. 60610

[21] Appl. No.: 274,155

[22] Filed: Jun. 16, 1981

[51] Int. Cl.³ .......................... G03B 1/04; G11B 15/32
[52] U.S. Cl. ..................................... 242/197; 206/389
[58] Field of Search ............... 242/55.19 A, 197–200, 242/194; 234/94, 97, 102; 352/73, 78 C; 264/132, DIG. 82; 206/534, 387, 389, 393; 360/93, 96, 132

[56] References Cited

U.S. PATENT DOCUMENTS

| | | | |
|---|---|---|---|
| 3,422,740 | 1/1969 | Nerwin | 242/71.1 X |
| 3,700,316 | 10/1972 | Kurechi | 352/78 C |
| 3,908,930 | 9/1975 | Gresens | 242/197 |
| 4,023,194 | 5/1977 | Batter, Jr. | 354/317 |
| 4,339,776 | 7/1982 | Langer et al. | 360/132 X |

*Primary Examiner*—Leonard D. Christian
*Attorney, Agent, or Firm*—Hill, Van Santen, Steadman & Simpson

[57] ABSTRACT

A coded cassette for magnetic tape, film and the like, has a clutch mechanism which prevents transport of the record medium unless a complementally-coded key, as a part of the drive mechanism, is engaged therewith for operating the clutch to an unlocked condition.

12 Claims, 11 Drawing Figures

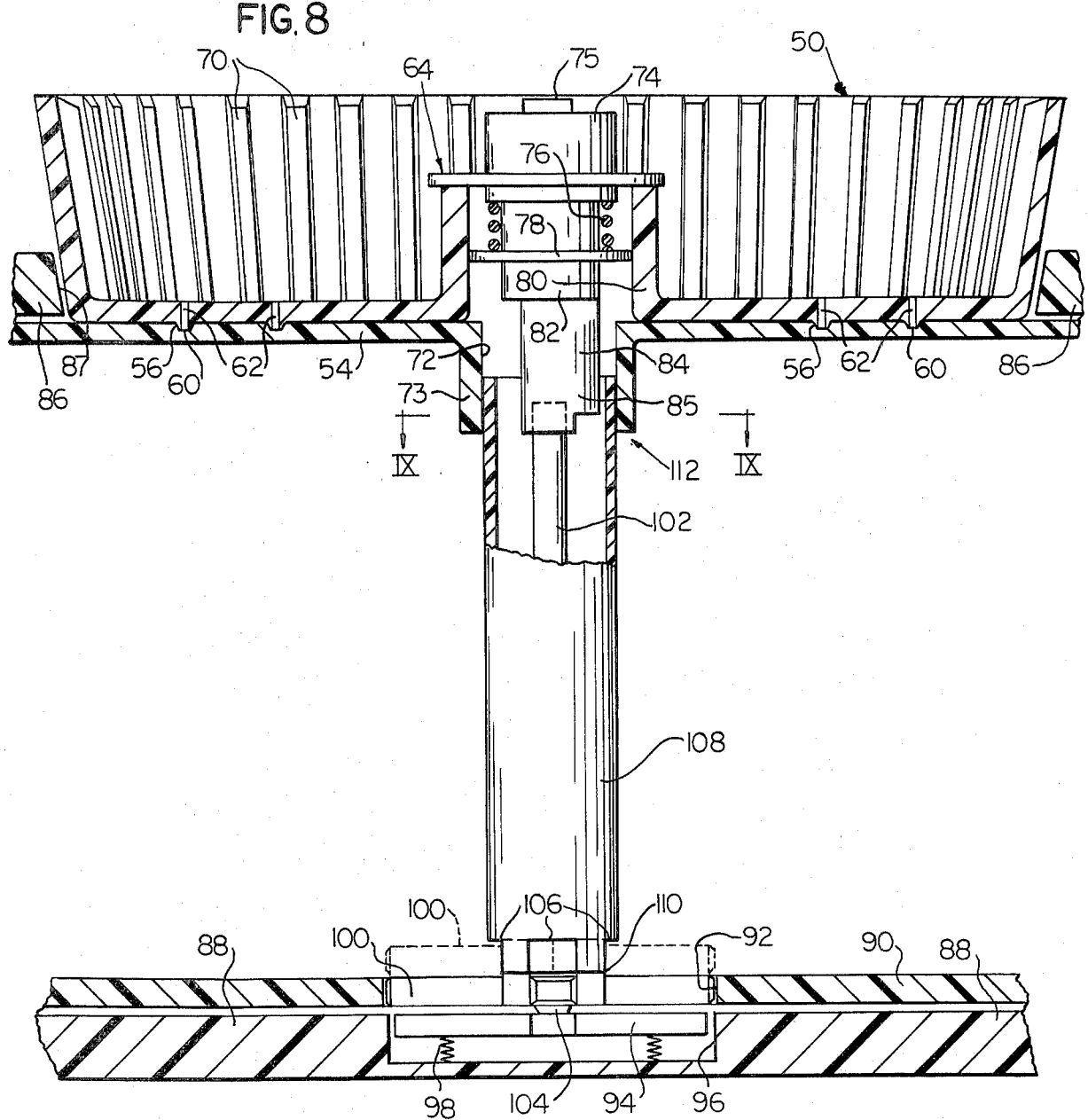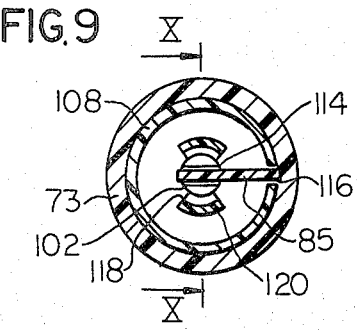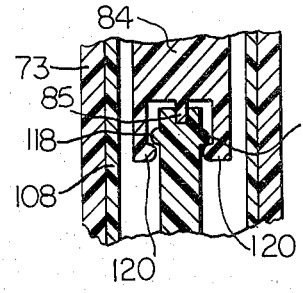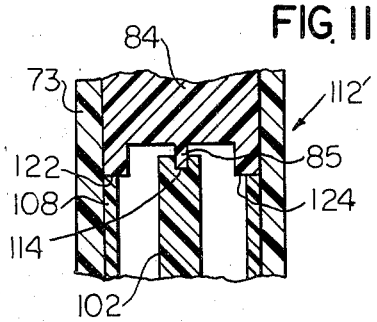

SECRECY-CODED CASSETTE

BACKGROUND OF THE INVENTION

1. Field of the Invention

The present invention relates to cassettes, cartridges, magazines and the like for transporting a record media, such as magnetic tape or photographic film, and more particularly to a secrecy-encoded structure which prevents transport and access to the data on the record medium unless the operator is equipped with an encoded key in the form of a transport drive element.

2. Description of the Prior Art

Cassettes, cartridges, magazines and the like, hereinafter simply referred to as cassettes, are well known in the art for holding and transporting a record media so that the same may be read by a machine or made visually perceptible. One such cassette is known, for example, from the Richard Crandall U.S. Pat. No. 4,258,986.

SUMMARY OF THE INVENTION

It is the object of the invention to provide a cassette of for carrying and transporting a record media past a reading station, the cassette being physically encoded to prevent transport of the media without an appropriate, similarly coded key, and to a method for making such encoded cassettes and keys.

According to the invention, a lock and key system is integrated into the cassette production process to provide a modified cassette which is totally inoperable without the insertion of an individually specific and correctly coded key for the particular cassette.

During cassette assembly, one of the two internal cassette reel disc is modified by replacing the normal reel assembly with a slip clutch reel assembly and a female (or male) type encoded top reel disc.

The key for the modified reel assembly is the gear wheel component, normally mounted on the top reel disc in the aforementioned U.S. Pat. No. 4,258,986, but remaining separate as the key in the modified cassette system. When properly seated on the reel assembly, the key, carrying the matching male (or female) type code, operates to engage and block the clutch reel assembly for transport operation (unlock the reel) and use of the stored information.

Creation of the encoded gear wheel and its complementary coded reel disc are accomplished during cassette production in a computer-controlled encoding system. In order to use the information contained in a secrecy security system cassette, according to the present invention, requires that the potential user either possess or gain access to essential parts of the system including the modified cassette containing the desired information and the correctly coded key which will only fit its coded cassette counterpart. Also, if the system is of the type disclosed in U.S. Pat. No. 4,258,986, the cassette may have a unique shape that will only be received in a correspondingly shaped receiving component of the reader.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 8 is a sectional view of a portion of a cassette with a reel having an encoded reel disc and a complementary coded key;

FIG. 9 is a sectional view, taken along the parting line IX—IX of FIG. 8, illustrating one embodiment of coupling between the key and the reel for unlocking the reel;

FIG. 10 is a sectional view taken along the parting line X—X of FIG. 9; and

FIG. 11 is a sectional view, in the manner of FIG. 10, illustrating another embodiment of coupling and unlocking between the key and the reel.

DESCRIPTION OF THE PREFERRED EMBODIMENTS

Figure 1:
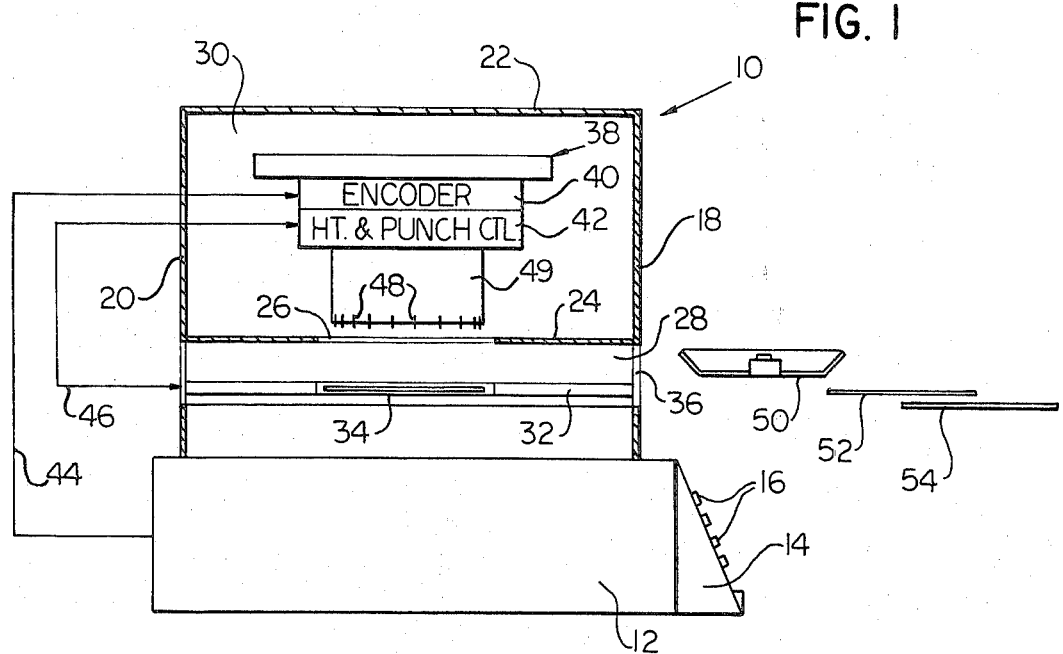
FIG. 1 is a schematic view, shown partially in section, of an apparatus for encoding a key and a cassette in accordance with the invention.

Referring to FIGS. 1–7, the production of the key and a reel disc according to the invention is illustrated. In FIG. 1, a computer-controlled station is generally illustrated at 10 as comprising a base 12 carrying a keyboard 14 with keys 16 for keying in codes. Above the base 12 is a plurality of walls 18–24 which define a heating chamber 28 and a control chamber 30.

In the heating chamber 28 is a heating coil 32 including a central opening 34 therein for receiving components to be heated. Access to the heating chamber may be gained by way of an opening 36 or by hinging of the upper portion of the housing for insertion of the components 50–54 which will be described in greater detail below.

With the control chamber 30 is a pre-programmed computer 38 which includes an encoder 40 and a heat and punch control unit 42. The encoder 40 receives information for encoding the code to the key and disc by way of lines 44 and the heat and punch control unit 42 controls the application of electrical energy 2 and senses, via thermistor circuits and the like, the temperature by way of lines 46.

The elements to be encoded, the elements 50, 52 and 54 comprise a plastic drive wheel 50, a thin foil-type metal plate 52 and a plastic top reel disc 54.

Assuming that the elements 50, 52 and 54 are in place within the aperture 34 of the heating coil 32, the encoding process is as follows.

An authorization code is entered into the pre-programmed computer 38 which, in response, selects and generates a unique code for the individual cassette. This case may, of course, be applicable to all duplicates of the cassette. The selected code corresponds to a set of metal pins 48, which may be of various shapes or configurations arranged in a punch-press operation drum 49 which matches the inner diameter of the gear wheel 50 and the reel disc 54. The pins 48 may be extended, for example, by a solenoid action, hydraulic actuation or the like.

The gear wheel 50 and the reel disc are constructed of two different plastics with widely different heat characteristics. The non-code carrying surfaces are extremely heat resistant, while the code carrying surfaces are capable of being softened at a specific temperature.

The thin metal heat conducting disc 52 is sandwiched between the bottom of the gear wheel and the top of the reel disc and inserted into the encoding system therewith. The edges of the thin metal disc contact the edges of the aperture 34 of the heating coil 32 and transfer the heat generated at the coil 32 to the plastic material of the gear wheel and the reel disc. When a predetermined temperature is attained, such as sensed by a thermistor or the like, and sufficient softening of the plastic occurs, the punch-press drum 49 is actuated causing the selected code pins to stamp the code into the components.

Figure 2:
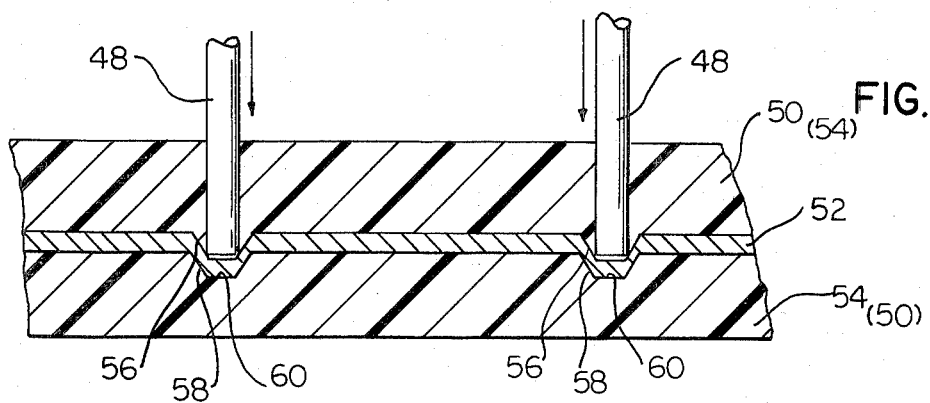
FIG. 2 is a sectional view schematically illustrating a portion of the encoding process.

As seen in FIG. 2, the punch pins 48 extend downwardly to an exact distance which permits the same to cause mirror-image projections on the bottom of the gear wheel 50 and the thin metal heating disc 52. The projections of the metal heating disc, in turn, create corresponding recesses in the top reel disc 54.

Figure 3:
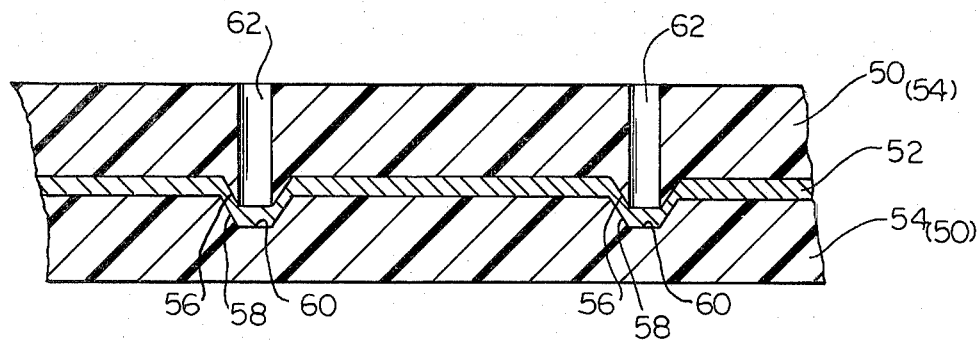
FIG. 3 is a schematic illustration of a completely encoded key and cassette reel disc.

Of course, and as indicated in FIGS. 2 and 3, the elements may be turned upside-down so that the reel disc 54 becomes the male encoded component and the drive wheel 50 becomes the female encoded component.

The purpose of the thin metal disc 52 is multifold in that:

1. It prevents sticking of and transfers heat to the plastic components during the stamping process;
2. It acts as a form to create the code shape;
3. It prevents excessive pin penetration;
4. It allows cooling while holding of the code shape until the separation of the components; and
5. It can represent a machine-readable file copy of the code.

In FIG. 2, the stamping operation is just complete and in FIG. 3 the pins 48 have been withdrawn for cooling of the components. In each figure it can be seen that the pins 48 create projections 56 on the bottom surface of the gear wheel 50, similar projections 58 on the bottom surface of the metal plate 52, and complementary recesses 60 in the upper surface of the reel disc 54.

Figure 4:
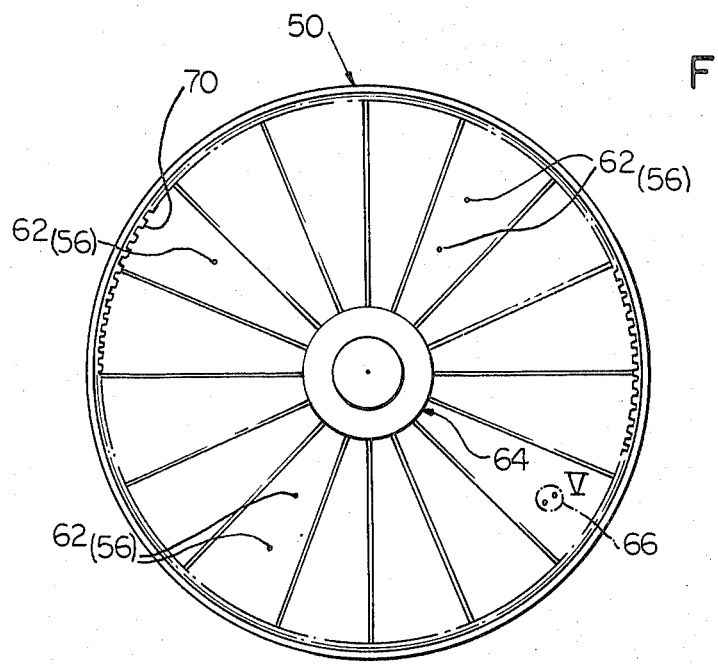
FIG. 4 is a top plan view of an encoded key.
Figure 5:
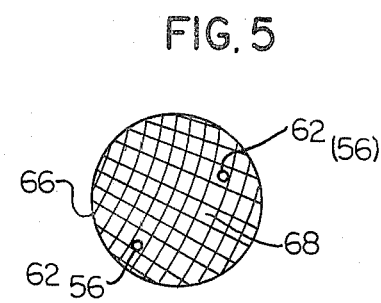
FIG. 5 is an enlarged portion of FIG. 4.
Figure 6:
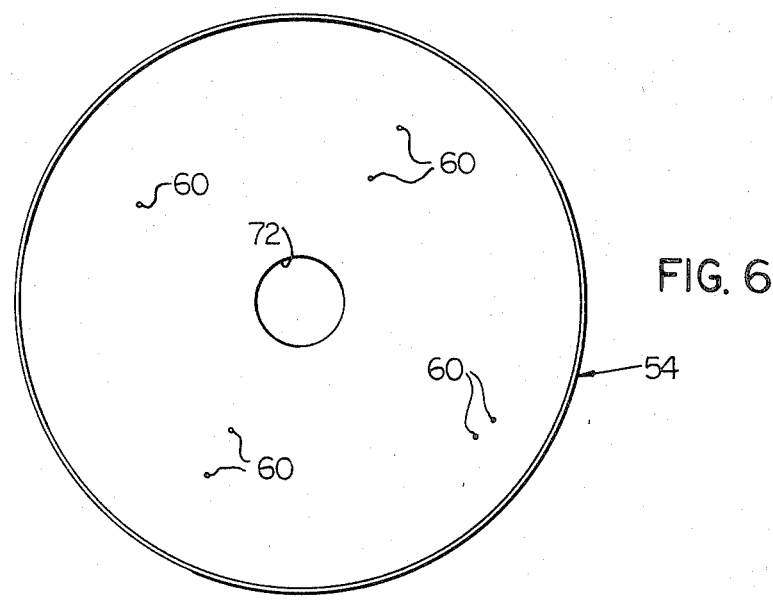
FIG. 6 is a top plan view of a reel disc encoded with the same code as the key of FIG. 4.
Figure 7:
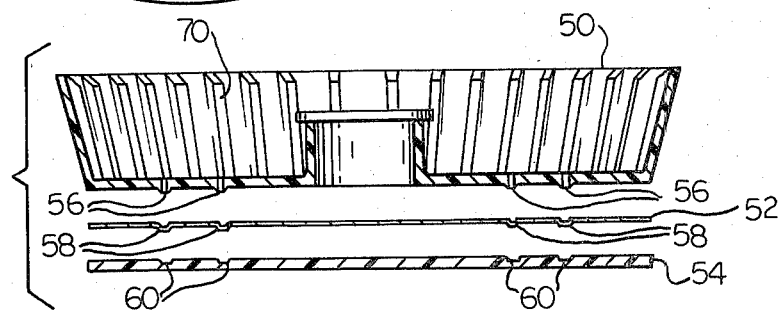
FIG. 7 illustrates the key and the encoded reel disc as the same are separated after encoding.

The same elements can be seen in the top plan views of FIGS. 4-6 and in the sectional view of FIG. 7.

In FIG. 4, the gear wheel 50 is also illustrated as including internal oblique teeth 70 for driving engagement with a reader, and a mechanism 64 for a locking and unlocking operation with the reel, as will be explained in greater detail below.

FIG. 5 illustrates that the gear wheel may be constructed of a plastic which has a grid of heat-resistant material in a heat-softening plastic, the latter receiving the code pins to create the bores 62 therethrough and the projections 56 on the opposite side.

In FIG. 6, the reel disc 64 is illustrated as carrying the same code as the wheel gear 50 of FIG. 4. Also, the reel disc 54 includes a central aperture 72 which will be discussed in greater detail below.

FIG. 7 illustrates the three components 50, 52, 54 after encoding, cooling and separation.

Referring to FIG. 8, an exemplary embodiment of a cassette employing secrecy structure of the present invention is illustrated in an exemplary embodiment. Reference characters of FIGS. 1-7 have been retained for the apparatus previously discussed, that is for the gear wheel 50 and the reel disc 54, the metal plate having been filed away as registration for the particular code employed.

In FIG. 8, only a portion of the cassette has been illustrated. Of course, there would be another reel which may also advantageously employ the same structure.

In FIG. 8, the cassette is generally illustrated as having an upper cassette wall 86 with an aperture therethrough for receiving a portion of the reel disc 50, and a bottom wall 88. The reel also comprises, in addition to the upper disc 54, a lower disc 90 having a shaped opening 92 therethrough, here in the form of a cross, which acts as a part of the locking and unlocking structure. A locking member 94, of similar shape, is received in a recess 96 of the cassette wall 88 and is spring loaded, as at 98, so as to be urged upwardly and, without the gear wheel 50 in place, to force a similarly shaped member 100 upwardly, as illustrated in broken lines, so that it clears the upper surface of the lower reel disc 90. In this position, the member 100 extends into slots in the wall of a tubular member 108 which will be discussed below. In this condition, the element 94 locks the lower reel disc 90 to the bottom cassette wall 88 so that the reel cannot be driven in either direction.

With the gear wheel (key) 50 properly mounted in place on the upper wheel disc 54 with the projections 56 properly seated in the recesses 60, the reel may be unlocked. This is the purpose of the apparatus 64. The apparatus 64 is constructed in the manner of a ball-point pen in which the extensible member 82 corresponds to that of the ink cartridge, a spring 76, seated against a member 78 mounted in a boss 80 corresponds to the lower barrel and spring structure of a ball-point pen, a push button 75 is mounted for axial movement within a housing 74, in the same manner as in a ball-point pen, and the housing 74 contains, in cooperation with an element moved up and down by the button 75 and the spring 76 an incrementally rotated, two-position element with a groove and ridge structure engagement with the inner wall of the housing 74, as in a ball point pen. Therefore, one depression of the push button 75 extends and latches the shaft 82, while another depression of the push-button 75 disengages the shaft 72 so that the same is forced upwardly by the bias provided by the spring 76 (engaged at its upper end with the shaft 82, not shown, but as in a ball point pen) and by the additional bias of the springs 98.

With the push-button 75 depressed so as to extend the shaft 82, a projection 84 of the shaft is also moved downwardly to engage a blade 85 carried thereby in a slot 114 which is a portion of an upper engagement apparatus 112.

Referring to FIG. 9, the blade 85 is shown in the slot 114 so as to provide rotational movement of the shaft 102 to rotate the member 100 and thus rotate the lower wheel disc 90 with the upper wheel disc 54 and the wheel gear 50 as the wheel gear 50 is driven. Prior to this, however, the extension of the shaft 82, the member 84 and the blade 85 causes downward movement of the element 100 so that the same also in cooperation with the projection 104, moves the locking member 94 down into the recess 96 so as to clear and unlock the lower reel disc 90.

At the same time, the blade 85 also is received in a slot 116 in the outer tubular member 108, moves the same downwardly so as to engage the upper surface of the lower reel disc 90, at points of material not removed for the elements 94, 100, generally at 110, to force the tube 108 into engagement with the upper surface of the lower reel disc 90.

The tubular member 108 has the record media, magnetic tape, microfilm and the like, wound thereabout, for take-up and pay-out of the same in moving the same past a reading station.

Referring to FIGS. 9 and 10, the shaft 102 comprises two or more projections 118, which may be constituted by a continuous ridge, which are engaged by two or more flexible fingers 120 for releasable engagement between the shaft 82 and the shaft 102. The bead-type element or elements 118 and the fingers 120 are shaped for sliding, yieldable engagement and disengagement.

It should be pointed out that the reel disc 54, the wheel gear 50 and the cassette wall 86 may include a combination or combinations of indicia for initial alignment of the elements and that the slot 114 may be a cross-structure or star-structure for flexibility in engagement.

Referring to FIG. 11, a variation of the coupling is illustrated at 112' wherein the blade 85, again, is received in a slot 114 of the shaft 102. In this embodiment, however, the blade 85 does not necessarily extend to and through the tubular member 108; however, the tubular member 108 has an upper surface 122 which is engaged by a depending surface 124 of the member 84 to press the tubular member 108 into engagement with the upper surface of the bottom reel disc 90 to cause media transport via the frictional engagement of the elements 84, 108 and 90.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A cassette and key comprising:
   a wall including a surface and a recess in said surface;
   a spring-loaded locking member mounted in said recess and biased to extend beyond said surface;
   a rotatably mounted bottom disc including an opening therethrough for receiving said locking member to prevent rotation of said bottom disc;
   a rotatably mounted top disc including an aperture therethrough;
   rod means for carrying a record medium including an axially movable first shaft having top and bottom ends, said top end received in said aperture and including first latch means, said bottom end including an unlocking member for entering said opening and engaging said locking member;
   lock control means for unlocking said bottom disc to enable rotation of said discs and said rod means, said lock control means including a gear wheel to be rotatably driven, a second shaft including second latch means for releasably engaging said first latch means, and shaft control means for selectively axially moving said shafts, when latched, downwardly to unlock said bottom disc and upwardly to permit the bias of said locking member to lock said bottom disc; and
   code means including first code elements on said top disc arranged in a first predetermined code pattern and second code elements on said gear wheel arranged in a second code predetermined pattern for engaging said first code elements and only permitting latching of said shafts when said first and second code patterns are the same.

2. The cassette and key of claim 1, wherein: said first shaft includes an axial projection extending from said bottom end beyond said unlocking member to ensure that said locking member clears said bottom disc.

3. The cassette and key of claim 1, wherein: said recess and said locking member are complementally shaped.

4. The cassette and key of claim 2, wherein: said locking and unlocking members each include at least one radially extending member, with respect to the axis of rotation.

5. The cassette and key of claim 4, wherein: said opening through said bottom disc includes a plurality of radially extending slots complemental to and greater in number than said radially extending unlocking members.

6. The cassette and key of claim 1, wherein: said first shaft includes at least one projection and said rod means includes a tube about said shaft for carrying the record medium including recess means for receiving said projection to engage said tube and shaft for mutual rotation.

7. The cassette and key of claim 1, wherein: said first code elements are recesses and said second code elements are projections.

8. The cassette and key of claim 1, wherein: said first code elements are projections and said second code elements are recesses.

9. The cassette and key of claim 1, wherein: said first latching means includes at least one radially extending projection and said second latching means includes at least one resilient hook-shaped finger.

10. The cassette and key of claim 1, wherein:
    said rod means comprises a tube about said first shaft for carrying the record media; and
    said second shaft includes at least one projection for engaging said tube and holding the same against said bottom disc for mutual rotation.

11. A cassette and key, comprising:
    a cassette housing;
    a record media supporting reel mounted for rotation in said housing including a first disc and a second disc, said first disc including first elements in a code pattern;
    a key including a gear wheel comprising second elements in a code pattern for engaging said first elements when the code patterns are the same; and
    locking means normally locking said second disc against rotation,
    said key further comprising unlocking means coupled to said locking means when said first and second elements are engaged and operable to unlock said locking means.

12. A cassette and key, comprising:
    a cassette housing;
    a record media supporting reel mounted for rotation in said housing including a first disc and a second disc, said first disc including first elements in a code pattern;
    a key including a wheel adapted to be driven which comprises second elements in a code pattern for engaging said first elements when the code patterns are the same; and
    locking means normally locking said second disc against rotation,
    said key further comprising unlocking means coupled to said locking means when said first and second elements are engaged and operable to unlock said locking means.

* * * * *